United States Patent
Hasegawa

(10) Patent No.: US 10,250,827 B2
(45) Date of Patent: Apr. 2, 2019

(54) IMAGING APPARATUS AND CONTROL METHOD THEREOF

(71) Applicant: CANON KABUSHIKI KAISHA, Tokyo (JP)

(72) Inventor: Reiji Hasegawa, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/409,915

(22) Filed: Jan. 19, 2017

(65) Prior Publication Data

US 2017/0208271 A1 Jul. 20, 2017

(30) Foreign Application Priority Data

Jan. 19, 2016 (JP) ................. 2016-008188

(51) Int. Cl.
*H04N 5/357* (2011.01)
*H04N 5/232* (2006.01)
(Continued)

(52) U.S. Cl.
CPC ......... *H04N 5/3572* (2013.01); *G02B 3/0006* (2013.01); *H04N 5/23212* (2013.01); *H04N 5/23293* (2013.01); *H04N 5/343* (2013.01); *H04N 5/353* (2013.01); *H04N 5/3696* (2013.01); *H04N 5/378* (2013.01)

(58) Field of Classification Search
CPC ............. H04N 5/3572; H04N 5/23212; H04N 5/23293; H04N 5/343; H04N 5/353; H04N 5/3696; H04N 5/378; G02B 3/0006
See application file for complete search history.

(56) References Cited

U.S. PATENT DOCUMENTS

2015/0002838 A1* 1/2015 Fukuda ............... G02B 7/346
356/123

FOREIGN PATENT DOCUMENTS

JP 2013-021615 A 1/2013
JP 2014-053701 A 3/2014
(Continued)

OTHER PUBLICATIONS

Japanese Office Action dated Oct. 24, 2017 in corresponding Japanese Patent Application No. 2016-008188 together with English translation, 11 pages.

(Continued)

*Primary Examiner* — Twyler L Haskins
*Assistant Examiner* — Fayez Bhuiyan
(74) *Attorney, Agent, or Firm* — Carter, DeLuca, Farrell & Schmidt, LLP

(57) ABSTRACT

An imaging apparatus has a focus adjustment mechanism based on auto focus adjustment of an imaging plane phase difference scheme. An imaging element has a plurality of micro-lenses and a plurality of photoelectric conversion units corresponding to the micro-lenses and acquires a pupil-divided image signal. An auto focus (AF) signal processing unit and a camera control unit perform shading correction on a image for each pupil division acquired from the imaging element. The recording medium control unit controls an operation of recording a correction value to be used in shading correction in a recording medium when the image signal before correction for each pupil division is recorded in the recording medium.

34 Claims, 15 Drawing Sheets

(51) Int. Cl.
*G02B 3/00* (2006.01)
*H04N 5/343* (2011.01)
*H04N 5/353* (2011.01)
*H04N 5/378* (2011.01)
*H04N 5/369* (2011.01)

(56) References Cited

FOREIGN PATENT DOCUMENTS

| JP | 2015-002400 A | 1/2015 |
| JP | 2015-225311 A | 12/2015 |
| WO | 2014/106917 A1 | 7/2014 |

OTHER PUBLICATIONS

Combined Search and Examination Report issued in corresponding application No. GB1700871.5 dated Jul. 17, 2017.

* cited by examiner

| R | Gr | R | Gr | R | Gr | R | Gr |
|---|----|---|----|---|----|---|----|
| Gb | B | Gb | B | Gb | B | Gb | B |

| R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B |

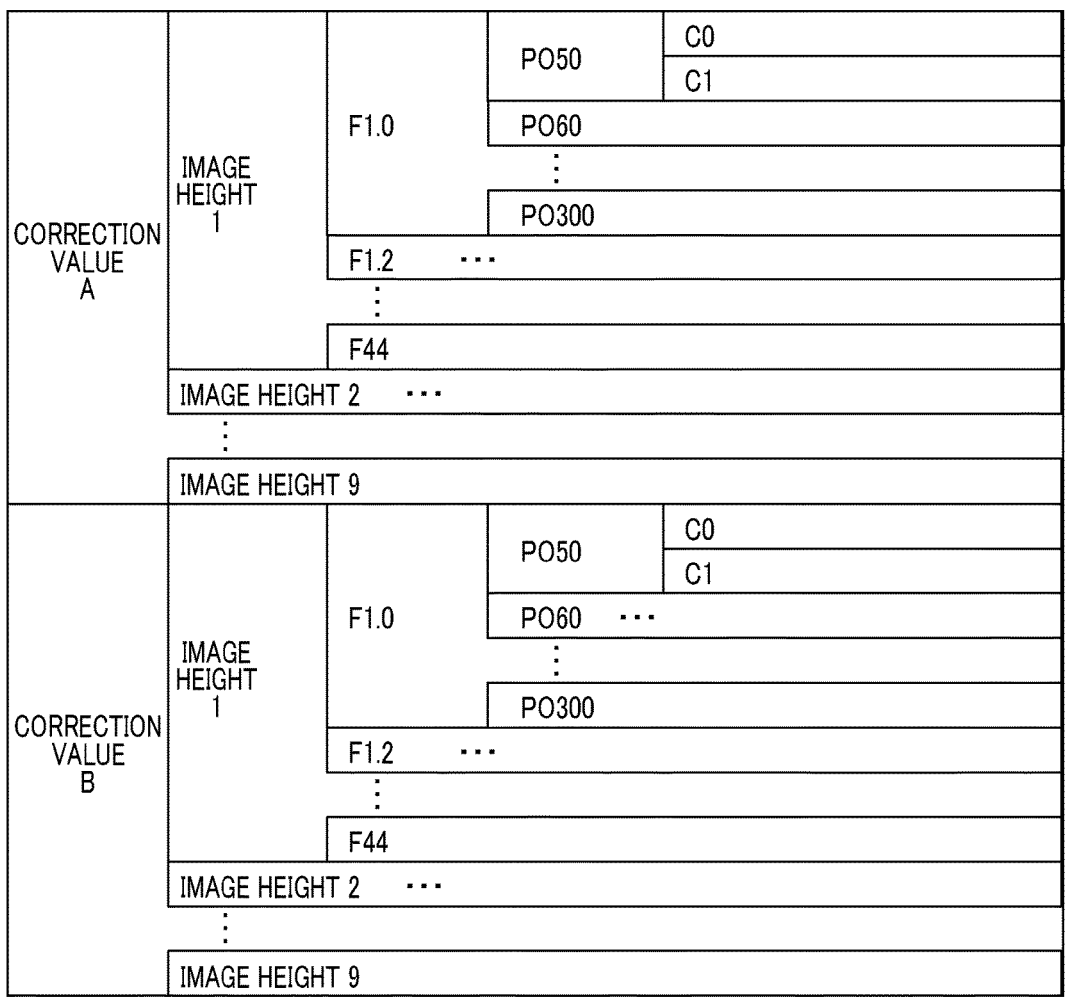

IMAGING APPARATUS AND CONTROL METHOD THEREOF

BACKGROUND OF THE INVENTION

Field of the Invention

The present invention relates to an imaging apparatus having a focus adjustment function based on auto focus adjustment of an imaging plane phase difference scheme.

Description of the Related Art

RAW image data is used to perform a development process after photographing in a personal computer (PC) or the like with respect to an image captured by a camera. The RAW image data is image data output by an imaging element or image data before development and is saved in a memory in reversible compression without reducing a size according to irreversible compression. A process of saving a RAW image is disclosed in Japanese Patent Laid-Open No. 2014-53701.

In auto focus adjustment (hereinafter abbreviated to AF) of an imaging plane phase difference scheme, pixels of the imaging element are subjected to a pupil division process and focus adjustment is performed according to a correlation calculation of an image division. The image division subjected to the pupil division process can be used in a field of application other than focus adjustment. At this time, a process of saving the divided image data as a RAW image separately from normally captured image data is performed.

A decrease in a light amount referred to as shading may occur in each of image divisions according to a positional relationship between an incident angle of a light flux and a photodiode of an imaging element in terms of a pupil-divided image. Thus, a shading correction process is performed. Because the shading is changed by factors such as an image height of an image, an exit pupil distance specific to a lens, or an F number, it is difficult to perform estimation after photographing. For this reason, if the shading correction process is not sufficiently performed, there is a possibility that image quality may be deteriorated when a pupil-divided image is used after photographing.

SUMMARY OF THE INVENTION

In the present invention, an imaging apparatus performs a shading correction process on an image of each pupil division after photographing.

The present invention in its first aspect provides an imaging apparatus as specified claims 1 to 10.

The present invention in its second aspect provides an imaging apparatus as specified claims 11 to 18.

The present invention in its third aspect provides a control method of an imaging apparatus as specified claims 19 and 20.

According to the present invention, an imaging apparatus can perform a shading correction process on a image of each pupil division after photographing.

Further features of the present invention will become apparent from the following description of exemplary embodiments (with reference to the attached drawings).

BRIEF DESCRIPTION OF THE DRAWINGS

FIGS. 11A and 11B are diagrams illustrating a configuration of a correction value table in the present embodiment.

DESCRIPTION OF THE EMBODIMENTS

Hereinafter, the best modes for carrying out the present invention will be described in detail with reference to the accompanying drawings. An embodiment to be described hereinafter is an example required to implement the present invention and may be modified or changed as needed depending on device configurations and various conditions to which the present invention is applied, and the present invention is not limited to the following embodiment.

Figure 1:
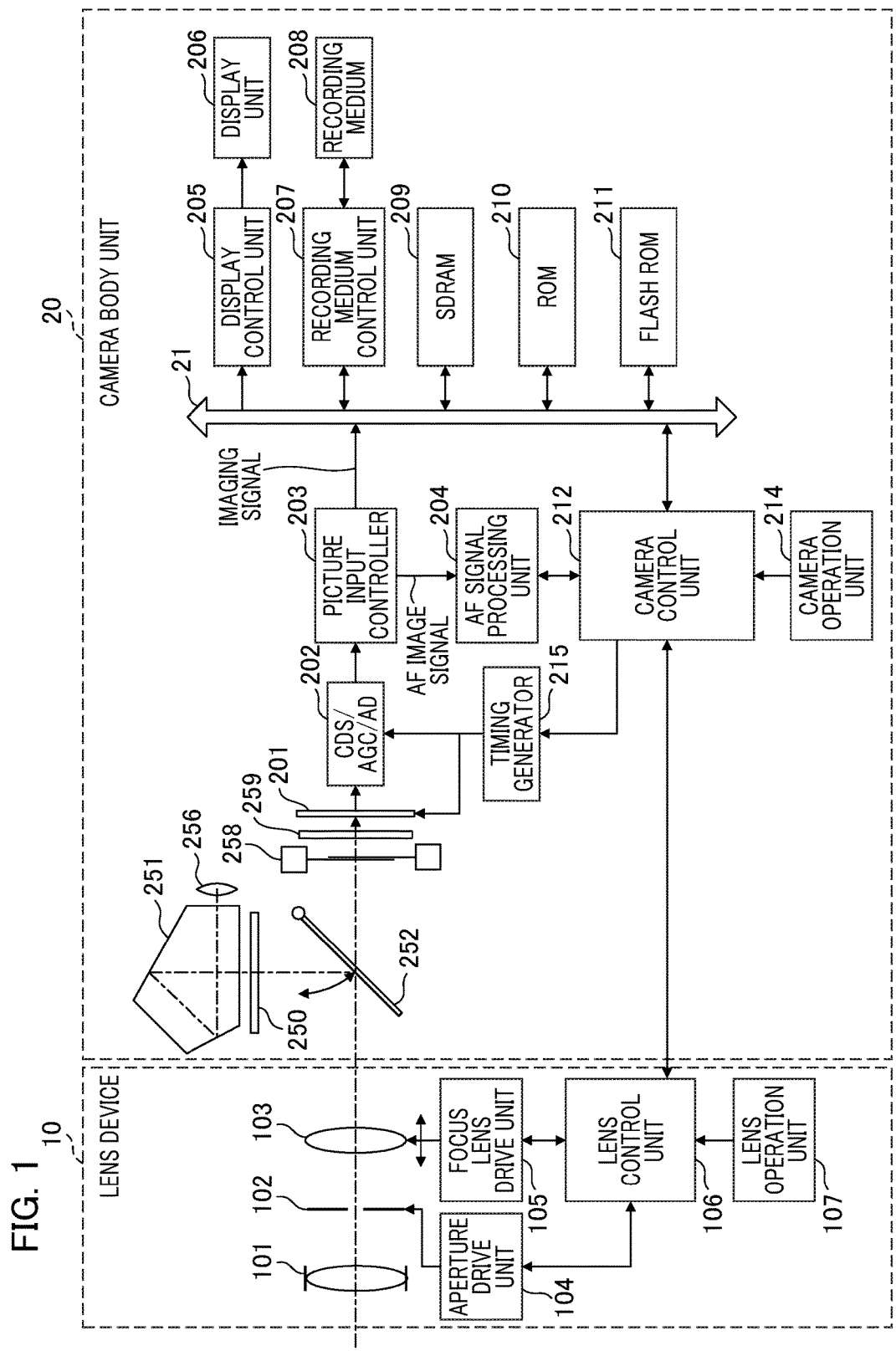
FIG. 1 is a block diagram illustrating a configuration example of a camera system in an embodiment of the present invention.

FIG. 1 is a block diagram illustrating a configuration example of an imaging apparatus according to an embodiment of the present invention. In the present embodiment, a configuration of a lens exchange type camera system including a lens device 10 and a camera body unit 20 is illustrated. A lens control unit 106 generally controls an operation of the entire lens device, and a camera control unit 212 generally controls an operation of the entire camera. The lens control unit 106 and the camera control unit 212 communicate information to each other.

First, a configuration of the lens device 10 will be described. A fixed lens 101, an aperture 102, and a focus lens 103 are optical members constituting a photographing optical system. The fixed lens 101 is a first group lens. The aperture 102 is driven by an aperture drive unit 104 and controls an amount of incident light for the imaging element 201 to be described later. The focus lens 103 is driven by the focus lens drive unit 105 to perform focus adjustment.

The lens control unit 106 controls the aperture drive unit 104 to determine an opening amount of the aperture 102 and controls the focus lens drive unit 105 to determine a position of the focus lens 103. The lens control unit 106 controls the drive units according to a control command and control information received from the camera control unit 212 and transmits lens control information to the camera control unit 212. The lens control unit 106 controls the lens device 10 according to an operation input signal from a lens operation unit 107.

Next, the configuration of the camera body unit 20 will be described. The camera body unit 20 acquires an imaging signal from a light flux passing through the photographing optical system of the lens device 10. The light flux passing through the photographing optical system of the lens device 10 is guided to a tunable quick-return mirror (hereinafter referred to as a movable mirror) 252. A center portion of the movable mirror 252 is a half-mirror and some light flux is transmitted when the movable mirror 252 moves down (a lowered state in which the movable mirror 252 is located in a lower portion of FIG. 1). This transmitted light flux is guided to a phase difference AF sensor (not illustrated). A phase difference AF sensor is an auto focus adjustment means, but is a means separate from an imaging plane phase difference AF to be described below. Because the phase difference AF sensor is not related to the present invention, detailed description thereof will be omitted.

On the other hand, light reflected by the movable mirror 252 forms an image on a matte screen 250 and reaches the eyes of a photographer via a pentaprism 251 and an eyepiece lens 256. Also, when the movable mirror 252 moves up (a state in which the movable mirror 252 is raised to the pentaprism 251 as indicated by an arrow), the light flux from the lens device 10 forms the image on the imaging element 201 via a focal plane shutter 258 which is a mechanical shutter and a filter 259. The focal plane shutter 258 has a front curtain and a rear curtain and controls transmission and shielding of the light flux from the lens device 10. The filter 259 has a function of cutting infrared light, ultraviolet light, or the like and guiding only visible light to the imaging element 201 and a function of an optical low-pass filter.

The light flux passing through the photographing optical system forms the image on a light reception plane of the imaging element 201 and is converted into signal charge according to an amount of incident light by a photodiode of the imaging element 201. The signal charge stored in each photodiode is sequentially read from the imaging element 201 according to a command of the camera control unit 212. That is, a voltage signal according to the signal charge is acquired on the basis a drive pulse assigned from a timing generator 215.

Figures 2A, 2B, 2C:
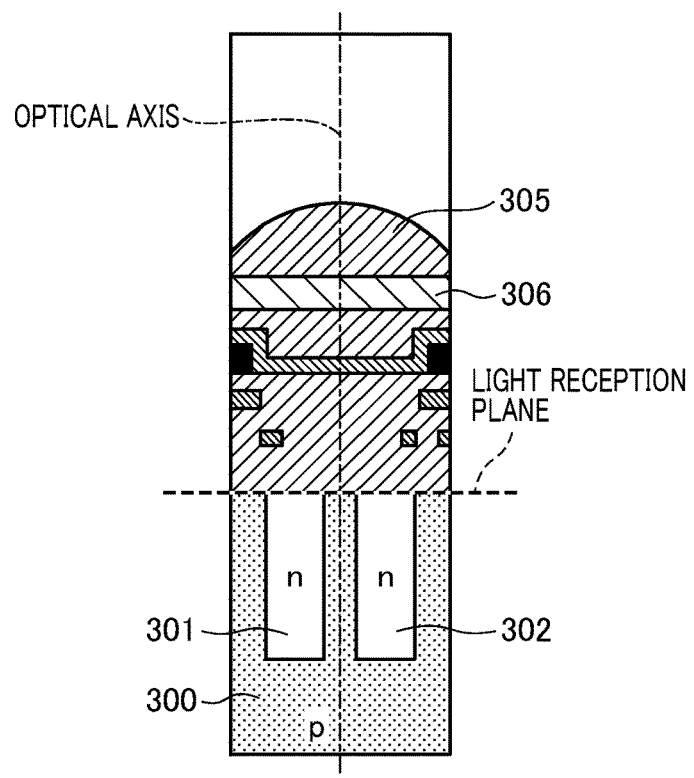
FIGS. 2A to 2C are diagrams illustrating a pixel configuration of an imaging plane phase difference scheme in the present embodiment.

A pixel configuration of the imaging element 201 will be described with reference to FIGS. 2A to 2C. FIG. 2A illustrates a pixel configuration in which a pupil division process is not performed as a reference. FIG. 2B illustrates a configuration example of two divisions for a pixel configuration in which the pupil division process is performed. R, G, and B correspond to color filters of red, green, and blue. As illustrated in FIG. 2B, the imaging element 201 has two photodiodes corresponding to one pixel to perform the imaging plane phase difference AF. A light flux from the object is separated by a micro-lens and forms images on the two photodiodes, so that it is possible to extract an imaging signal and an AF image signal. One signal of signals of the two photodiodes is designated as an image signal A and the other signal is designated as an image signal B. A signal obtained by adding the image signal A to the image signal B, i.e., an image signal "A+B," is acquired as an imaging signal. The image signal A and the image signal B from the separate photodiodes are acquired as the AF image signal. Based on the image signal A and the image signal B, the AF signal processing unit 204 to be described below performs a correlation calculation on the two image signals and calculates an image shift amount and various types of reliability information.

FIG. 2C illustrates a cross-sectional structure of a pixel unit. A micro-lens 305 is formed to concentrate incident light onto an upper side of a light reception plane. Two photoelectric conversion units 301 and 302 are formed as the photoelectric conversion unit 300, but the number of divisions can be arbitrarily set. The photoelectric conversion units 301 and 302 correspond to each focus detection pixel. The photoelectric conversion units 301 and 302 have a configuration of a pin structure photodiode in which an intrinsic layer is sandwiched between a p-type layer and an n-type layer or a pn junction photodiode in which an intrinsic layer is omitted. A color filter 306 is formed between the micro-lens 305 and the photoelectric conversion unit 301 or 302. Spectral transmittance of a color filter is changed for each sub-pixel as needed or the color filter is omitted. Light incident on the pixel unit is concentrated by the micro-lens 305 and the photoelectric conversion units 301 and 302 receive light after spectral separation by the color filter 306. In the photoelectric conversion units 301 and 302, after pairs of electrons and holes are generated according to an amount of received light and separated by a depletion layer, the negatively charged electrons are stored in the n-type layer (not illustrated). On the other hand, the holes are discharged outside the imaging element through the p-type layer connected to a constant voltage source (not illustrated). The electrons stored in the n-type layers of the photoelectric conversion units 301 and 302 are transferred to an electrostatic capacitance unit (FD) via a transfer gate and converted into a voltage signal, and the voltage signal is output as a pixel signal.

In FIG. 1, the imaging signal and the AF image signal read from the imaging element 201 are input to a CDS/AGC/AD converter 202. The CDS/AGC/AD converter 202 is a signal processing unit which performs correlation double sampling, gain adjustment, and signal digitalization for removing reset noise. The CDS/AGC/AD converter 202 outputs the processed signal to an image input controller 203. The image input controller 203 stores a signal output from the CDS/AGC/AD converter 202 in a synchronous dynamic random access memory (SDRAM) 209. Also, the image input controller 203 outputs an AF image signal to an AF signal processing unit 204.

The image signal read from the SDRAM 209 is sent to a display control unit 205 via a bus 21. The display control unit 205 performs control for displaying a image on a display unit 206. Also, in a mode in which an imaging signal is recorded, a recording medium control unit 207 performs a process of recording the image signal in the recording medium 208. The display control unit 205 and the recording medium control unit 207 are connected to the bus 21.

A read only memory (ROM) 210 is connected to the bus 21 and a control program to be executed by a camera control unit 212, various types of data necessary for control, and the like are stored therein. A flash ROM 211 is connected to the bus 21 and various types of setting information related to an operation of the camera body unit 20 such as user setting information are stored therein.

The AF signal processing unit 204 acquires an AF image signal to perform pixel summation and a correlation calculation and calculate the image shift amount or reliability information. The reliability information is a two-image coincidence degree, a two-image sharpness degree, contrast information, saturation information, flaw information, and the like. The AF signal processing unit 204 outputs the calculated image shift amount and reliability information to the camera control unit 212. Based on the acquired image shift amount and reliability information, the camera control unit 212 notifies the AF signal processing unit 204 of a change in settings for calculating them. For example, the camera control unit 212 performs a process of setting a wide region in which a correlation calculation is performed if the image shift amount is large, a process of changing characteristics of a band-pass filter according to contrast information, and the like. Details of the correlation calculation will be described below using FIG. 7, FIGS. 9A to 9C, and FIGS. 13A to 13C.

The imaging signal and the two AF image signals (the image signal A and the image signal B), i.e., a total of three signals, are extracted from the imaging element 201 in the present embodiment, but the present invention is not limited to this method. In consideration of a load of the imaging element 201, there is, for example, a method of extracting the imaging signal and one AF image signal and acquiring a difference between the imaging signal and the AF image signal within the image input controller 203. For example, it is possible to acquire the image signal "A+B" and the image signal A, subtract the image signal A from the image signal "A+B," and acquire the image signal B.

The camera control unit 212 executes operations of camera functions of various types according to a user operation input from the camera operation unit 214 as well as processes within the camera body unit 20. For example, processes such as turning ON/OFF a power supply, changing settings, starting still-image/video-image recording, starting AF control, confirmation of a record video, and the like are executed. Also, the camera control unit 212 transmits and receives information to and from the lens control unit 106 of the lens device 10. The camera control unit 212 transmits a control command or control information of the movable lens to the lens control unit 106 and acquires information of the lens device 10 from the lens control unit 106.

The camera operation unit 214 includes switches or buttons of various types to be operated by the user. For example, a release switch is a two-stage switch in which a first switch SW1 and a second switch SW2 are sequentially brought into an ON state according to a push amount. SW1 is turned on when the release switch is pushed about halfway and SW2 is turned on when the release switch is fully pushed.

Figure 3:
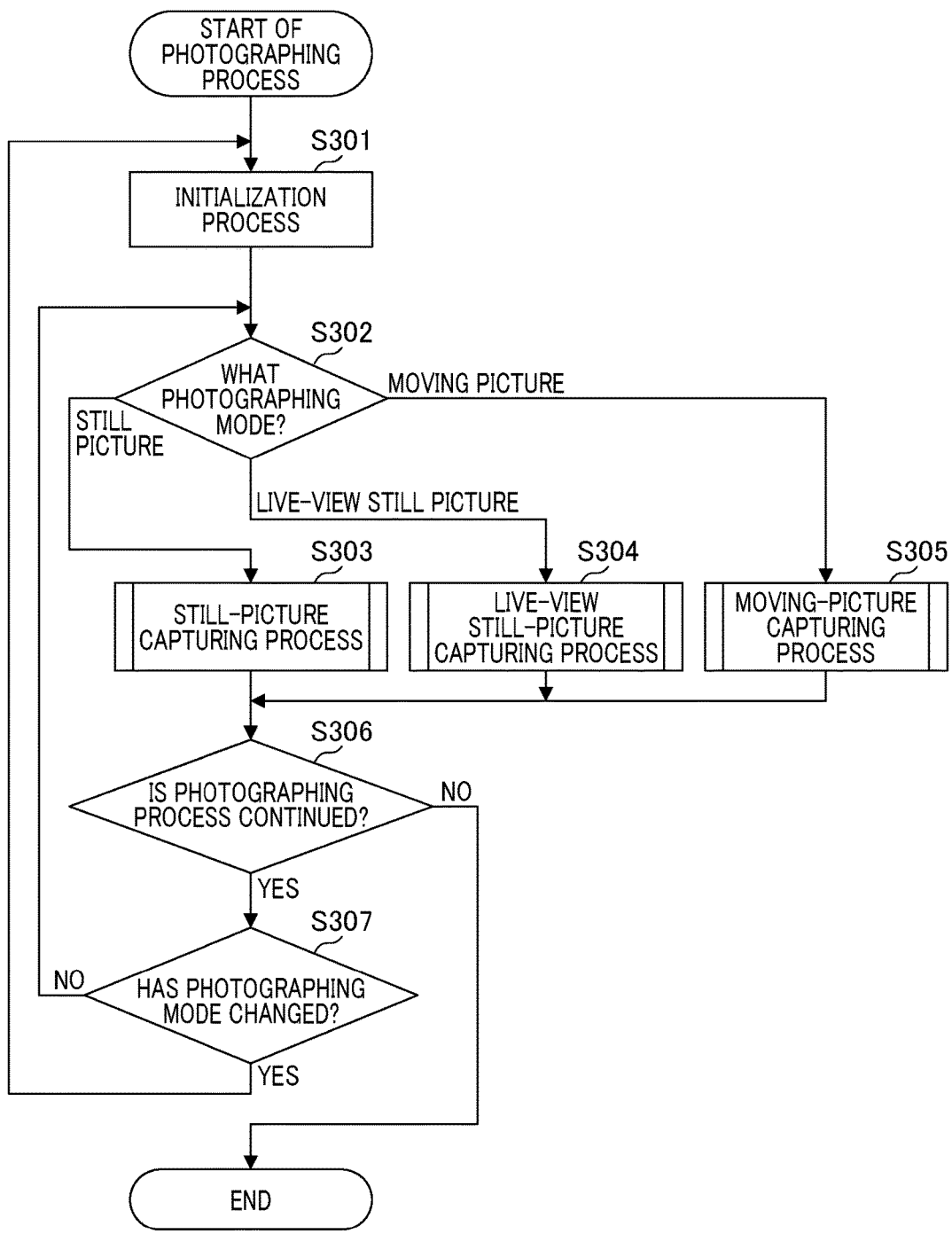
FIG. 3 is a flowchart illustrating a photographing process in the present embodiment.

Next, a basic operation in the camera body unit 20 of FIG. 1 will be described. FIG. 3 is a flowchart illustrating a procedure of a photographing process of the camera body unit 20. An initialization process of the camera body unit 20 is executed in S301 and the process proceeds to S302. In S302, the camera control unit 212 determines a photographing mode. Examples of the photographing mode include a still-image capturing mode, a live-view still-image capturing mode, and a video-image capturing mode. The process proceeds to S303 if a determination result is the still-image capturing mode, proceeds to S304 if the determination result is the live-view still-image capturing mode, and proceeds to S305 if the determination result is the video-image capturing mode.

A still-image capturing process is performed in S303, a still-image capturing process in a live-view state is performed in S304, and the video-image capturing process is performed in 305. Details of the processes of S303, S304, and S305 will be described in detail below. After the process of S303, S304, or S305, the process proceeds to S306.

In S306, the camera control unit 212 determines whether a photographing process has stopped. When the photographing process has not stopped, the process proceeds to S307. When the photographing process has stopped, the photographing process ends. When the photographing process has stopped, it is possible to perform the operation other than photographing when the power supply of the camera is interrupted such as the user setting process of the camera, the reproduction process for confirming the captured still-image or video-image, or the like.

In S307, the camera control unit 212 determines whether a photographing mode has changed. If the photographing mode has changed, the process returns to S301 and a process of a photographing mode changed to after an initialization process is executed. Also, if the photographing mode has not changed, the process returns to S302 and a process of a current photographing mode is continued.

Figure 4:
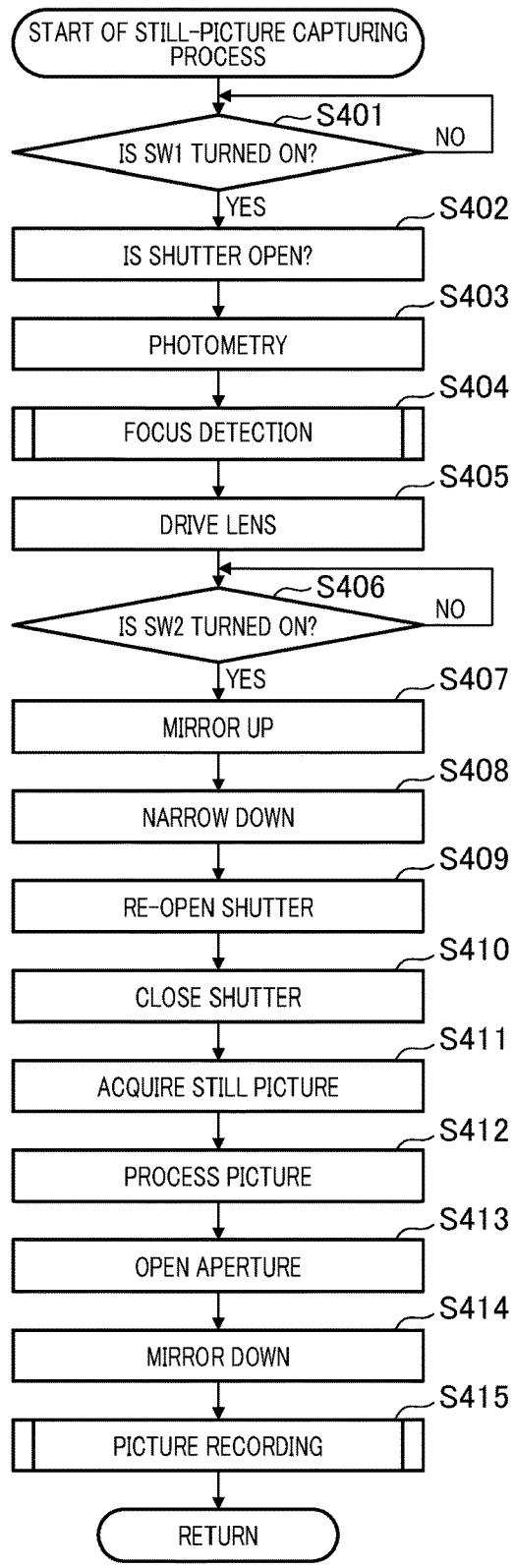
FIG. 4 is a flowchart illustrating a still-image capturing process in the present embodiment.

The still-image capturing process of S303 of FIG. 3 will be described with reference to FIG. 4. In S401, the camera control unit 212 determines whether the first switch SW1 of the release switch of the camera operation unit 214 has been turned on. If S21 has been turned on, the process proceeds to S402. The process of S401 is iterated until SW1 is turned on and a standby process is continued.

In S402, the camera control unit 212 opens and controls the focal plane shutter 258. In S403, a photometric process is performed. After the light flux from the object passes through the lens device 10 and is reflected by the movable mirror 252, the light flux passes through the pentaprism 251 and reaches a photometric circuit (not illustrated) and the photometric process is performed. Alternatively, the method of measuring light passing through the lens device 10, transmitted through the movable mirror 252, and reaching the imaging element 201 may be provided.

In S404, a focus detection process is performed. The camera control unit 212 and the AF signal processing unit 204 perform a focus detection process using a focus detection pixel of the imaging element 201 of FIG. 1. Details of the process of acquiring defocus information according to the imaging plane phase difference detection will be described below using FIG. 7.

In S405, the camera control unit 212 transmits the signal of the lens drive amount to the lens control unit 106 based on the focus detection result of S404. The lens control unit 106 controls the focus lens drive unit 105 based on the transmitted signal of the lens drive amount. The focus lens drive unit 105 moves the focus lens 103 to a focusing position.

In S406, the camera control unit 212 determines whether the second switch SW2 of the release switch of the camera operation unit 214 has been turned on. If SW2 has been turned on, the process proceeds to S407. The process of S406 is iterated until SW2 is turned on and the standby process is continued.

In S407, the camera control unit 212 controls the movable mirror 252 such that the movable mirror 252 is brought into a mirror-up state. In S408, the camera control unit 212 transmits aperture value information based on the photometry result in S403 to the lens control unit 106. The lens control unit 106 controls the aperture drive unit 104, so that narrowing down is performed until the set aperture value is reached. In S409, the camera control unit 212 re-opens and controls the focal plane shutter 258. Because the focal plane shutter 258 is already in an open state, the focal plane shutter 258 is temporarily closed and operated to be re-opened after the storage of the imaging element 201 is started. Alternatively, the control for opening the shutter may be electronically performed by controlling the focal plane shutter 258 in the same speed timing curve as that of a scheduled rear curtain to be closed in S410, releasing the reset of each line of the imaging element 201, and starting storage. This is the well-known technology of a so-called electronic front curtain shutter.

In S410, the camera control unit 212 closes the focal plane shutter 258 and performs a charge operation of the focal plane shutter 258 as preparation for the next operation. When a predetermined time has elapsed, the camera control unit 212 reads the image signal from the imaging element 201 with respect to the image input controller 203 and acquires a still image in S411. In S412, the camera control unit 212 performs various types of image processing such as flaw correction, a development process, white balance adjustment, and image compression.

In S413, the camera control unit 212 instructs the lens control unit 106 to open the aperture. The lens control unit 106 controls the aperture drive unit 104 such that the aperture is opened. In S414, the camera control unit 212 controls the driving of the movable mirror 252 and sets a mirror-down state. In S415, the recording medium control unit 207 performs the process of recording the read image signal in the recording medium 208. Details of the recording process will be described below using FIG. 14.

Figure 5:
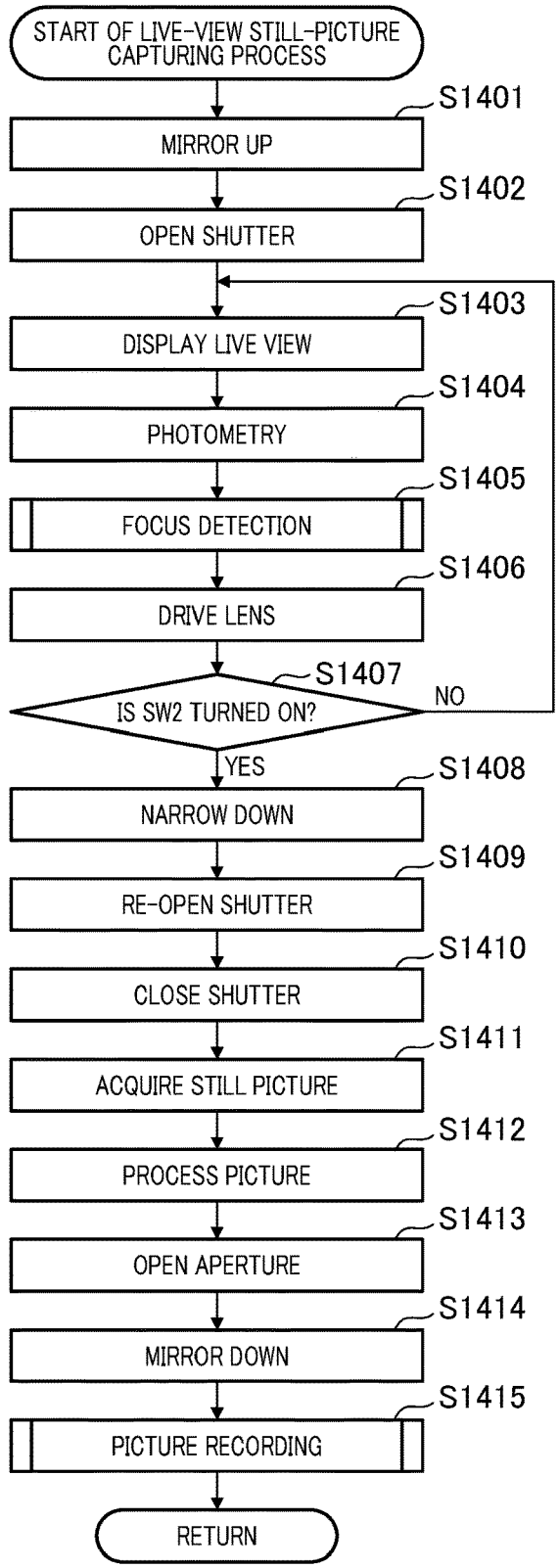
FIG. 5 is a flowchart illustrating a still-image capturing process in a live-view state in the present embodiment.

The still-image capturing process in a live-view state of S304 of FIG. 3 will be described with reference to FIG. 5. The processes of S1402 and S1404 to S1406 of FIG. 5 are similar to those of S402 to S405 of FIG. 4 and the processes of S1408 to S1415 of FIG. 5 are similar to those of S408 to S415 of FIG. 4. Consequently, differences will be mainly described below.

In S1401, the camera control unit 212 controls the driving of the movable mirror 252 and the movable mirror 252 moves up to the pentaprism 251. The focal plane shutter 258 is opened in S1402 and the process proceeds to S1403. In S1403, the camera control unit 212 performs image processing of the image signal obtained through photoelectric conversion from an optical image formed on the imaging element 201. The display control unit 205 displays the image on the display unit 206, so that live-view display is performed.

According to the photometric result in S1404, appropriate exposure control is performed using the aperture value, a shutter speed, and a sensor gain of the imaging element. Details of the focus detection process of S1405 will be described below using FIG. 7. The driving of the focus lens is controlled based on the lens drive amount in S1406 and the process proceeds to S1407. In S1407, the camera control unit 212 determines whether or not the second switch SW2 of the lens switch has been turned on. If SW2 has been turned on, the process proceeds to S1408. Also, if SW2 has not been turned on, the process proceeds to S1403 and the live-view display is continued.

In S1408, the camera control unit 212 transmits aperture value information based on the focus detection result to the lens control unit 106. The lens control unit 106 controls the aperture drive unit 104 and narrowing down is performed until the set aperture value is reached. Therefore, the processes of S1409 to S1415 are executed. Details of the recording process of S1415 will be described below using FIG. 14.

Figure 6:
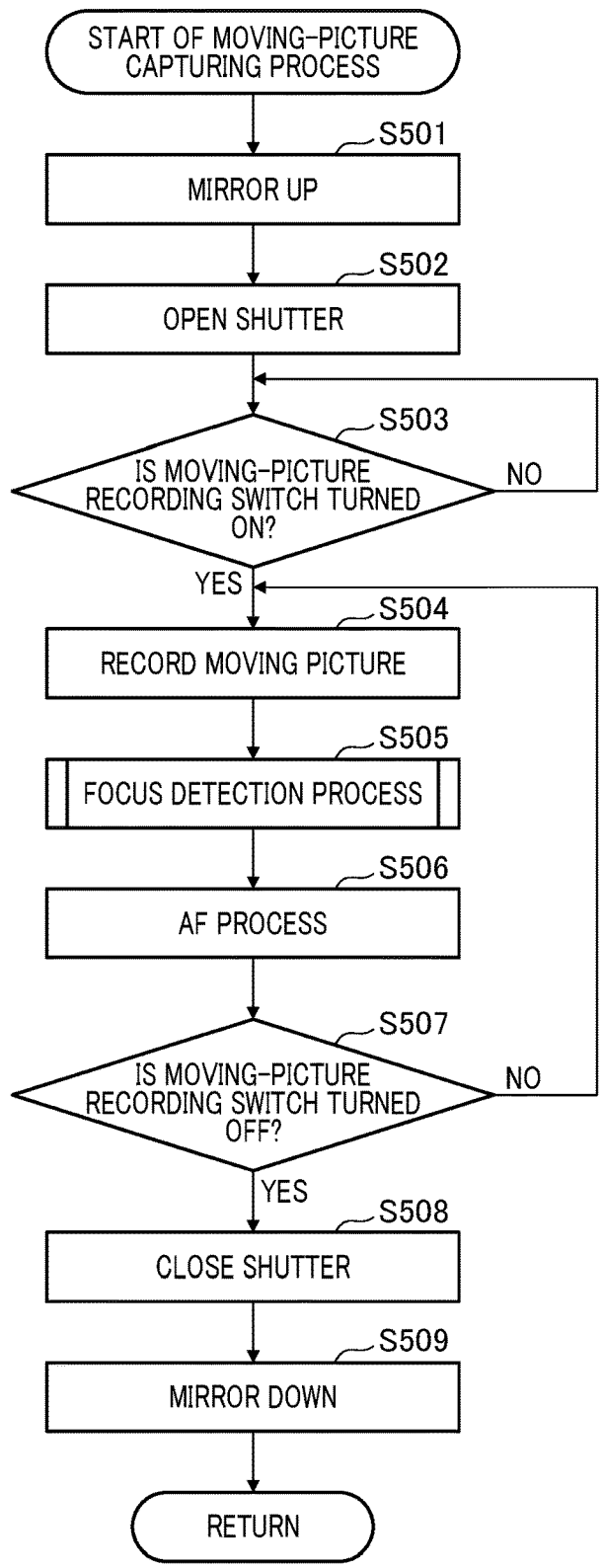
FIG. 6 is a flowchart illustrating a video-image capturing process in the present embodiment.

Next, the video-image capturing process of S305 of FIG. 3 will be described with reference to FIG. 6. In S501, the camera control unit 212 controls the driving of the movable mirror 252 and the movable mirror 252 moves up to the pentaprism 251. The camera control unit 212 opens the focal plane shutter 258 in S502. Thus, a light flux passing through the lens device 10 can reach the imaging element 201.

In S503, the camera control unit 212 determines an operation state of a video-image recording switch of the camera operation unit 214. If the video-image recording switch has been turned on, the process proceeds to S504. If the video-image recording switch has not been turned on, the process of S503 is iterated with the live-view display and the standby process is continued.

In S504, the process of recording video-image information is performed. In S505, the camera control unit 212 performs a focus detection process. Details will be described below using FIG. 7. An AF process is executed in S506 and the focus lens 103 is driven based on the defocus amount detected in S505. In S507, the camera control unit 212 determines the operation state of the video-image recording switch. If the video-image recording switch has been turned off, the process proceeds to S508. If the video-image recording switch has not been turned off, the process returns to S504 and video-image recording is continued. In S508, the camera control unit 212 ends the video-image recording and closes the focal plane shutter 258. In S509, the camera control unit 212 controls the driving of the movable mirror 252 and the movable mirror 252 is brought into the mirror-down state.

Figure 7:
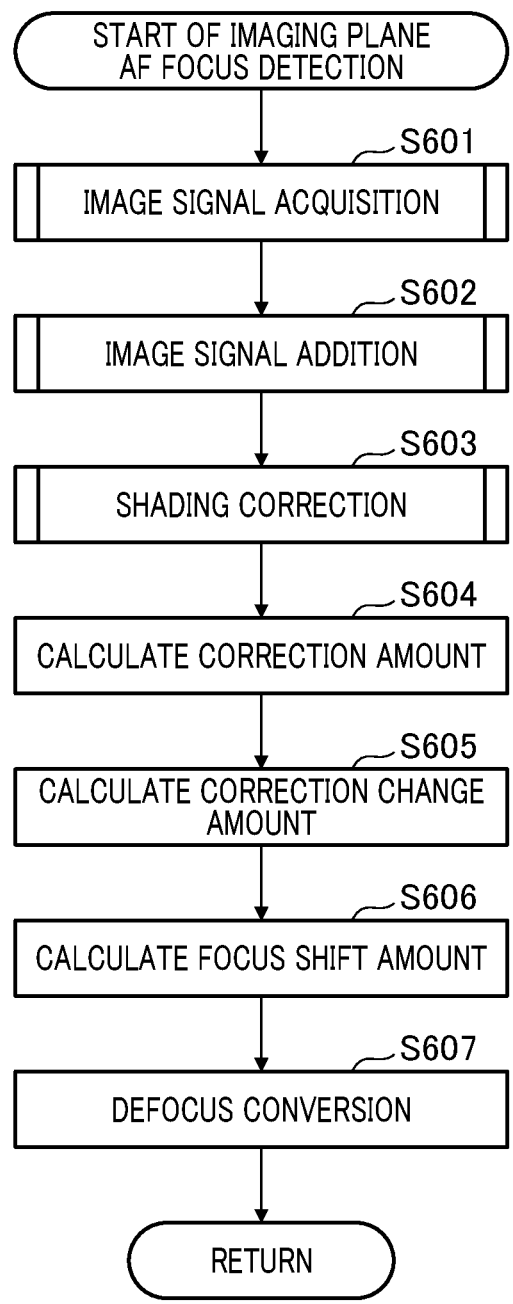
FIG. 7 is a flowchart illustrating a focus detection process in the present embodiment.
Figure 8:
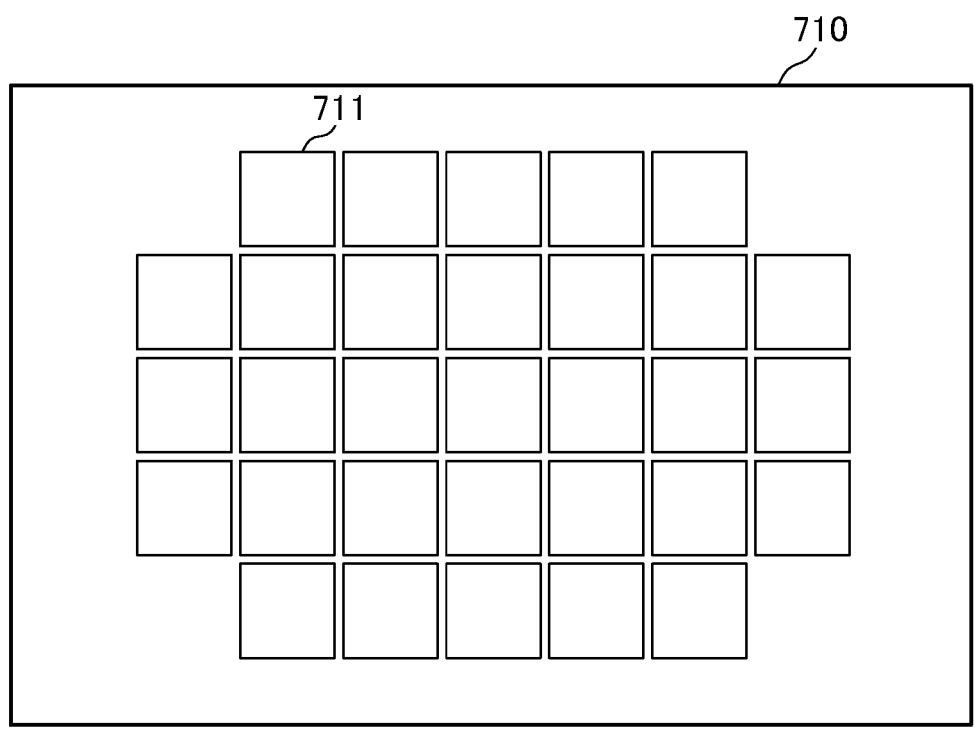
FIG. 8 is a diagram illustrating a position of a focus detection frame in the present embodiment.

Focus detection using the imaging plane phase difference AF function will be described in detail with reference to FIGS. 7 and 8. FIG. 7 is a flowchart illustrating the focus detection process of the camera control unit 212 and the AF signal processing unit 204. FIG. 8 illustrates an arrangement example of a measurement position (a ranging point) at which the focus detection is possible in the imaging element 201. In FIG. 8, a plurality of frames 711 are shown in a pixel part 710 in which the imaging by the imaging element 201 is possible. Each frame 711 indicates the focus detection position at which the focus detection is enabled using the imaging plane phase difference AF function. In the present embodiment, the example of 31 frames is shown in consideration of convenience of the user. According to the image captured by the imaging element 201, a video image is displayed on a display screen of the display unit 206 in the video-image capturing mode. At this time, the plurality of frames 711 are displayed in accordance with the display screen of the display unit 206 if the focus detection position is displayed.

In S601 of FIG. 7, the process of acquiring image signals from a focus detection range arbitrarily set by the photographer is performed. In S602, a summation process of the acquired image signals is performed. Details of S601 and S602 will be described below using FIGS. 9A to 9C. In S603, a shading correction process of the image signals summed in the S602 is performed. The shading correction process will be described below using FIGS. 10A to 10D.

In S604, the correlation amount is calculated from the image signal. Details of a calculation process will be described below using FIGS. 12A to 12C. In S605, a correlation change amount is calculated from the correlation amount calculated in S604. In S606, a focus shift amount is calculated from the correlation change amount calculated in S605. Details of the calculation process of S605 and S606 will be described below using FIGS. 13A to 13C. These processes are performed according to the number of focus detection regions. After the process of converting the focus shift amount into the defocus amount is performed for each focus detection region in S607, the focus detection process ends.

Figure 9A:
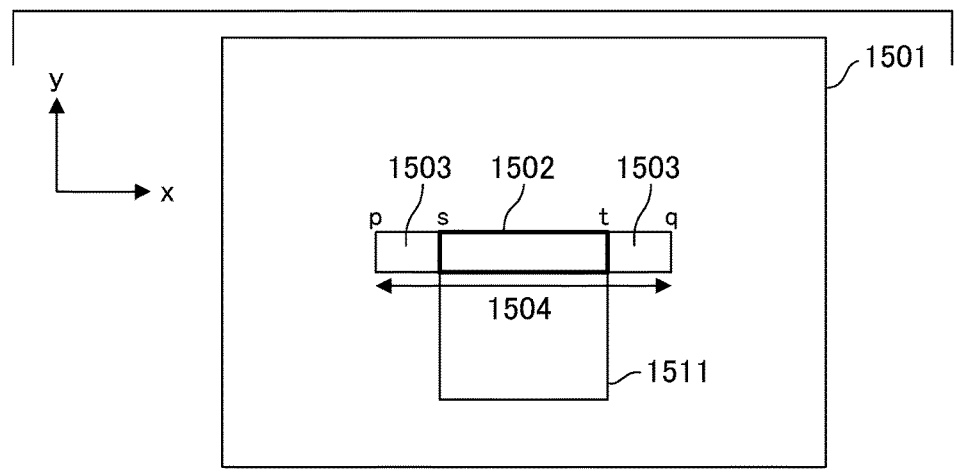
FIGS. 9A to 9C are diagrams illustrating a focus detection region in the present embodiment.
Figure 9B:
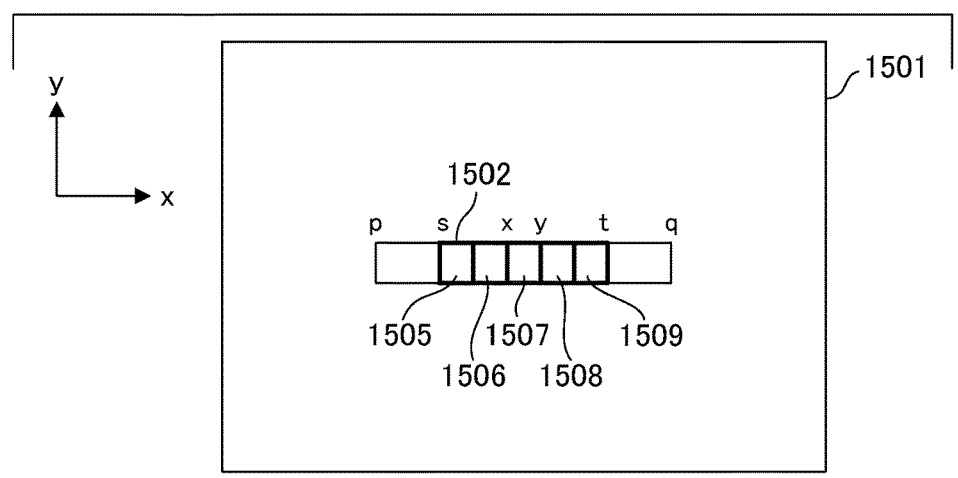
Figure 9C:
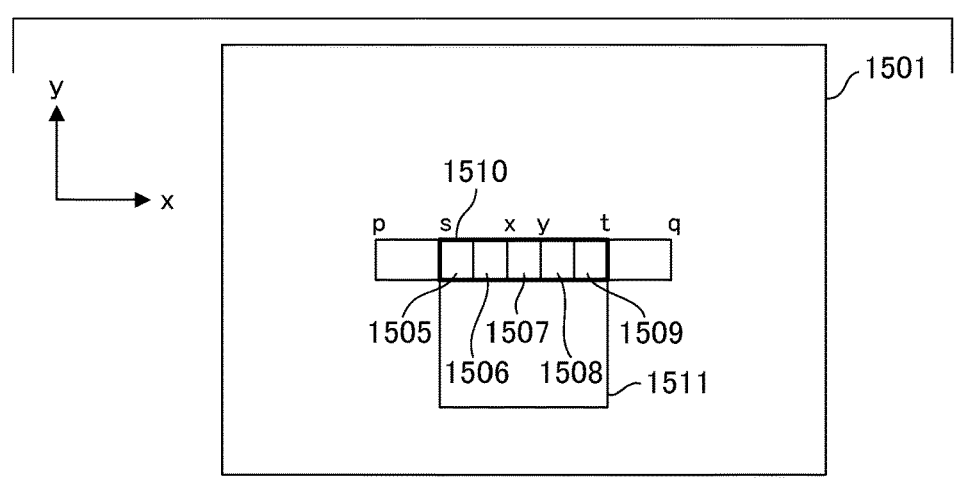

FIGS. 9A to 9C are diagrams illustrating examples of the focus detection range to be handled in the focus detection process, i.e., the region in which the image signal is acquired. The left/right direction is defined as an x-axis direction and the up/down direction is defined as a y-axis direction. FIG. 9A illustrates the focus detection range on the pixel array of the imaging element 201. In a pixel array 1501, the example of the focus detection range 1502 is shown. A shift region 1503 necessary for a correlation calculation is also shown. A region 1504 is a region including a region indicated by the focus detection range 1502 and the shift region 1503 and is the region necessary to perform the correlation calculation. Coordinates of the x-axis direction are indicated by p, q, s, and t in FIGS. 9A to 9C. The range of coordinates p to q indicates the region 1504 and the range of coordinates s to t is the focus detection range 1502. To facilitate the understanding of description, a height in the y-axis direction of each region is designated as one line. If focus detection is performed on an area of a plurality of lines as indicated by a region 1511, the process of summing the pixel signals in a vertical direction in advance is performed (S602: FIG. 7). The process of summing the correlation amounts will be described below.

FIG. 9B is a diagram illustrating the case in which the focus detection range 1502 is divided into five. The example in which the focus shift amount is calculated using a divided focus detection region as the unit and focus detection is performed will be described in the present embodiment. Focus detection regions when the focus detection range 1502 is divided into five are indicated as regions 1505 to 1509. The focus detection result in a region having highest reliability among the plurality of focus detection regions is selected and the focus shift amount calculated in the selected region is used. The focus detection range may be allocated to each focus detection region in FIG. 8 by dividing and it may be possible to adjust the length of the field of view by connecting the division regions in the necessary length.

FIG. 9C is a diagram illustrating a temporary focus detection region 1510 when the focus detection regions 1505 to 1509 of FIG. 9B are connected. That is, the focus detection region 1510 is the region obtained by connecting the focus detection regions 1505 to 1509 and the focus shift amount calculated from the region in which the plurality of focus detection regions are connected is used.

The focus detection process is executed in accordance with the focus detection frame illustrated in FIG. 8. For example, the region 1511 illustrated in FIG. 9C corresponds to the first focus detection frame 711 illustrated in the upper left of FIG. 8. Also, the method of arranging focus detection regions, the size of t region, and the like are not limited to the example of the present embodiment, and can be changed in the scope without departing from the subject matter of the present invention.

Figure 10A:
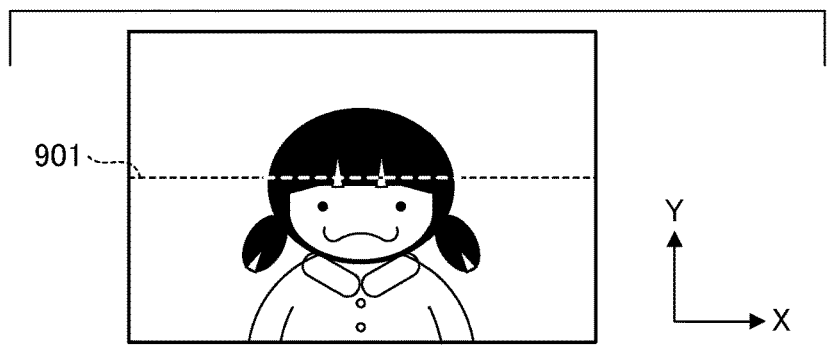
FIGS. 10A to 10D are diagrams illustrating shading correction in the present embodiment.
Figure 10B:
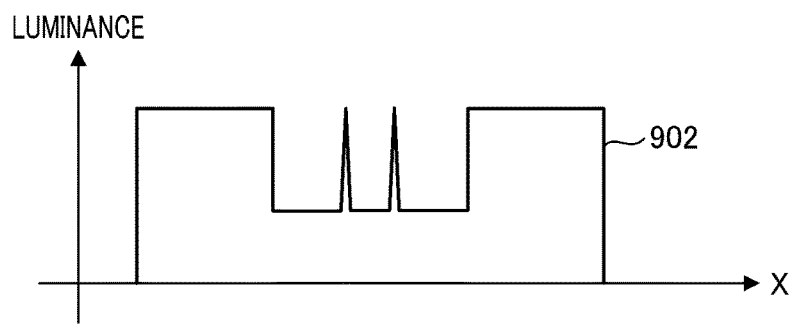

The shading correction process on the image signal acquired from the focus detection region set in FIGS. 9A to 9C will be described with reference to FIGS. 10A to 10D. FIG. 10 illustrates an image example and the image signal is assumed to be extracted from a line 901. The left/right direction is defined as the X-axis direction and the up/down direction is defined as a Y-axis direction. FIG. 10B illustrates a luminance distribution 902 corresponding to the X coordinate on the line 901. The horizontal axis represents the X coordinate and the vertical axis represents luminance. The result of summation of the image signal A and the image signal B is indicated as the graph of the luminance distribution 902.

Figure 10C:
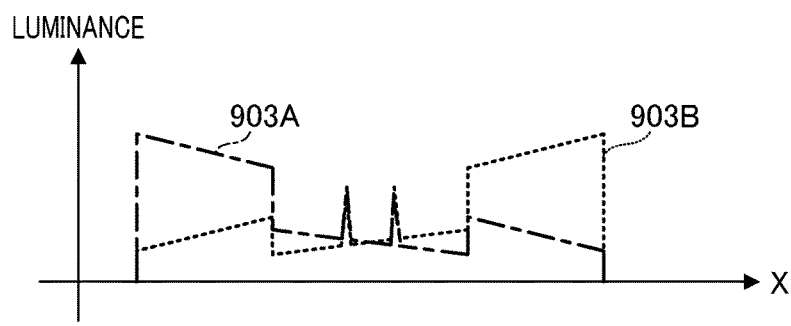

FIG. 10C illustrates luminance distributions of the image signal A and the image signal B. The horizontal axis represents the X coordinate and the vertical axis represents luminance. Pixels corresponding to the micro-lens are divided as described with reference to FIGS. 2A to 2C and the amount of incident light changes according to a left/right image height. The image signal A is indicated by the graph of the luminance distribution 903A and the image signal B is indicated by the graph of the luminance distribution 903B. If shading occurs and has an influence on the luminance distribution, the accuracy of the correlation calculation to be described below is likely to decrease. Therefore, shading correction is performed. Also, even when the image signal A and the image signal B are used in an external device such as a PC after the image signal A and the image signal B are acquired, use thereof is made easy due to performing the following shading correction.

FIGS. 11A and 11B are diagrams illustrating the method of recording the shading correction value in the camera control unit 212. FIG. 11A illustrates the example in which an image height is divided into 9 (=3×3). Because the shading correction value changes according to the image height, an amount of data according to the image height is necessary. That is, in this example, correction values corresponding to the imaging element 201 are separately held for image heights 1 to 9. In this case, the shading correction value between adjacent image heights needs to be connected.

FIG. 11B illustrates the configuration example of a correction value table. A correction value A corresponds to the image signal A and a correction value B corresponds to the image signal B. That is, because the shading correction value is different between the image signal A and the image signal B, it is necessary to use individual shading correction values. Also, because the correction value changes according to the image height as illustrated in FIG. 11A, correction values corresponding to image heights 1 to 9 are separately held. Further, because the shading correction value is changed by an F number (an aperture value) of the aperture 102 or an exit pupil distance PO value of the lens device 10, it is necessary to store all change amounts. In the lens exchange type camera system, the shading correction value is selected according to the lens device 10 attached to the camera body unit 20.

Specifically, the shading correction value is represented by the following formula.
C0: 0th-order correction constant
Cn: nth-order correction coefficient (n: natural number)
Z: Correction value for real image
X: X coordinate on image $$Z = C0 + C1*X \quad (1)$$

Formula (1) represents the correction value in a first-order formula, but this is an example. The correction value may be represented by the following second-order formula.

$$Z = C0 + C1*X + C2*X^2 \quad (2)$$

Alternatively, the correction value may be represented by a higher-order formula. The connection can be smoothly made between image heights.

Resolution is limited in relation to the correction value table illustrated in FIG. 11B and it should be noted that a data amount is larger when more detailed correction information is held. Therefore, an interpolation process or the like is performed. It is only necessary to smoothly make the connection in relation to the image height, but it is possible to obtain coefficients by performing the interpolation calculation on an intermediate F number and a PO value in relation to the F number and the PO value.

F: Real F number
Fa: F number adjacent to opening side held in table
Fc: F number adjacent to closing side held in table
PO: Real PO value
POa: PO value adjacent to small side held in table
POb: PO value adjacent to large side held in table
C0a: Correction value (table value) in Fa and POa
C0b: Correction value (table value) in Fa and POb
C0c: Correction value (table value) in Fc and POa
C0d: Correction value (table value) in Fc and POb
When they are set as above, $$Fr=(Fc-F)/(Fc-Fa) \qquad (3)$$

$$POr=(POb-PO)/(POb-POa) \qquad (4)$$

In this case, an formula for obtaining a 0th-order correction constant C0 is as follows.

$$C0=C0a+Fr*(C0c-C0a)+POr*(C0b-C0a)+Fr*POr* \\ (C0a-C0b-C0c+C0d) \qquad (5)$$

A first-order correction coefficient C1 can be similarly calculated.

In the shading correction process, parameters obtained by inverse conversion with respect to characteristics illustrated in FIG. 10C are provided. Hereinafter, in relation to the X coordinate in an image, a correction value for the image signal A is denoted by Za and a correction value for the image signal B is denoted by Zb. Correction values are represented by the following formula.

$$Za=C0a+C1a*X \qquad (6)$$

$$Zb=C0b+C1b*X \qquad (7)$$

C0a and C0b are 0th-order correction constants for the image signal A and the image signal B, respectively. C1a and C1b are first order correction coefficients for the image signal A and the image signal B, respectively.

Figure 10D:
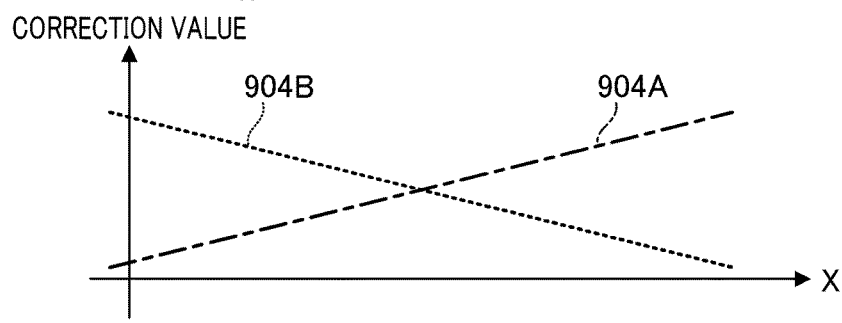

The graph line is illustrated in FIG. 10D. The horizontal axis represents an X coordinate and the vertical axis represents the correction value. A graph line 904A indicates a correction value Za and the correction value increases with the increase of the X coordinate value. A graph line 904B indicates a correction value Zb and the correction value decreases with the increase of the X coordinate value. The process of multiplying the correction value Za by the luminance distribution 903A illustrated in FIG. 10C and multiplying the correction value Zb by a luminance distribution 903B illustrated in FIG. 10C is performed. Thereby, both the image signal A and the image signal B are corrected to be image signals close to the luminance distribution 902 illustrated in FIG. 10B. Data of correction values illustrated in the graph lines 904A and 904B of FIG. 10D is provided as the correction value table of FIG. 11B according to characteristics of a photosensor of the imaging element 201. The correction value table data as adjustment values for each unit in a factory may be held in the storage unit of the camera body unit 20.

Figure 12A:
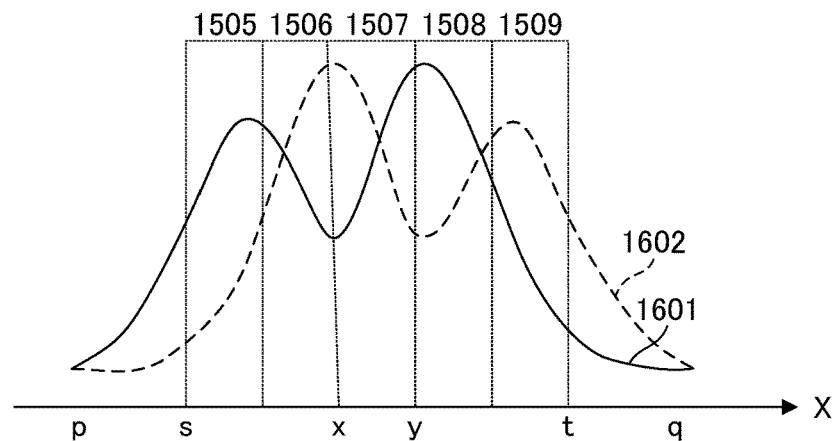
FIG. 12A to 12C are diagrams illustrating an image signal obtained from a focus detection region in the present embodiment.
Figure 12B:
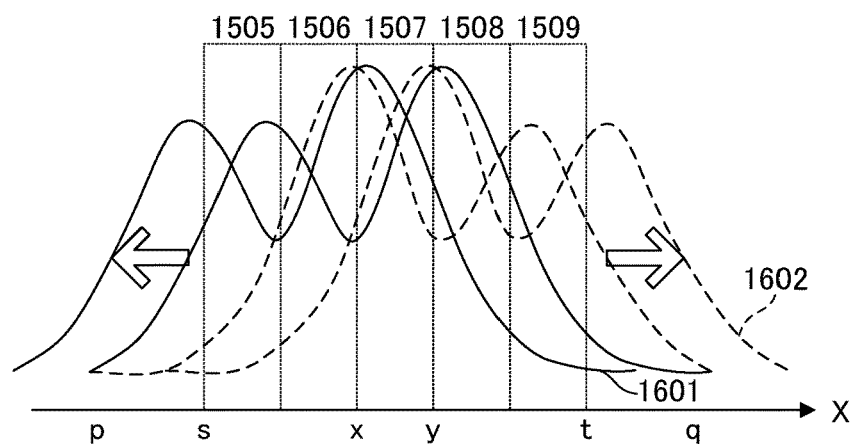
Figure 12C:
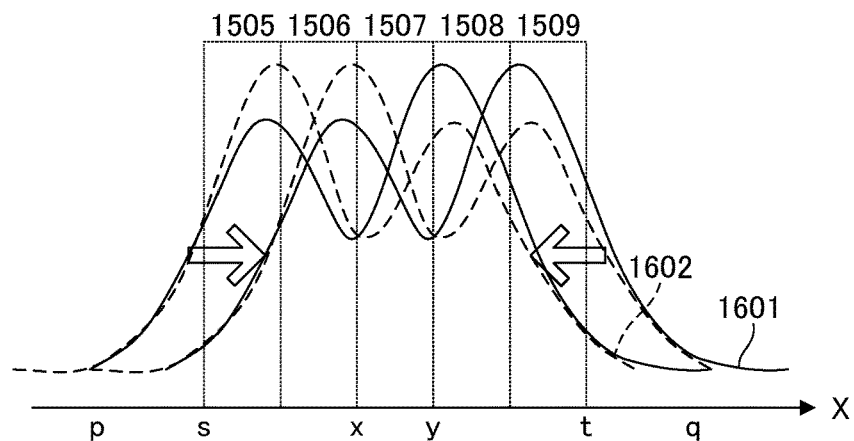

The process of calculating the correlation amount using the image signal after shading correction will be described with reference to FIGS. 12A to 12C. FIGS. 12A to 12C illustrate image signals after shading correction described with reference to FIGS. 10A to 10D is performed after acquisition from focus detection regions set in FIGS. 9A to 9C. The horizontal direction represents the X coordinate and the vertical direction represents the level of the image signal. As in FIGS. 9A to 9C, the focus detection range is denoted by coordinates s to t. A range indicated by coordinates p to q is the range necessary for the focus detection calculation based on the shift amount. Also, the range indicated by coordinates x to y represents one division focus detection region. As in FIGS. 9A to 9C, five division focus detection regions 1505 to 1509 are illustrated.

FIG. 12A is a waveform diagram illustrating the image signal before shift processing. A solid line 1601 indicates the image signal A and a dotted line 1602 indicates the image signal B. FIG. 12B is a diagram of the case in which the image signal waveform illustrated in FIG. 12A is shifted in a positive direction. Also, FIG. 12C is a diagram of the case in which the image signal waveform illustrated in FIG. 12A is shifted in a negative direction. When the correlation amount is calculated, the process of shifting each of image signal waveforms (see 1601 and 1602) by one bit in an arrow direction is performed and subsequently the correlation amount (denoted by COR) is calculated.

First, each of the image signal A and the image signal B is shifted by one bit. At this time, the sum of absolute values of differences between the image signals A and B is calculated. The number of shifts is indicated by an integer variable i, the image signal A is denoted by A[k] using a position variable k of the X axis direction, and the image signal B is denoted by B[k]. The minimum number of shifts is "p−s" in FIGS. 12A to 12C and the maximum number of shifts is "q−t" in FIGS. 12A to 12C. Also, x is a set of starting coordinates of the focus detection region and y is the set of ending coordinates of the focus detection region. The correlation amount COR[i] in the number of shifts i can be calculated by the following Formula (8).

$$COR[i] = \sum_{k=x}^{y} |A[k+i] - B[k-i]| \qquad (8)$$

Here, i is (p−s)<i<(q−t).

Further, the addition calculation may be performed in the vertical direction. The example in which pixel signal are summed in the vertical direction has been described with reference to FIGS. 9A to 9C. As another example, here, the case in which the correlation amount COR[i] is calculated is assumed for a region 1510 of FIG. 9C. If the region in which the focus is desired to be detected actually is the region 1511, the process of calculating correlation amounts COR[i] for lines and summing the correlation amounts COR[i] is performed. The following process is performed using the correlation amount after the addition process.

Figure 13A:
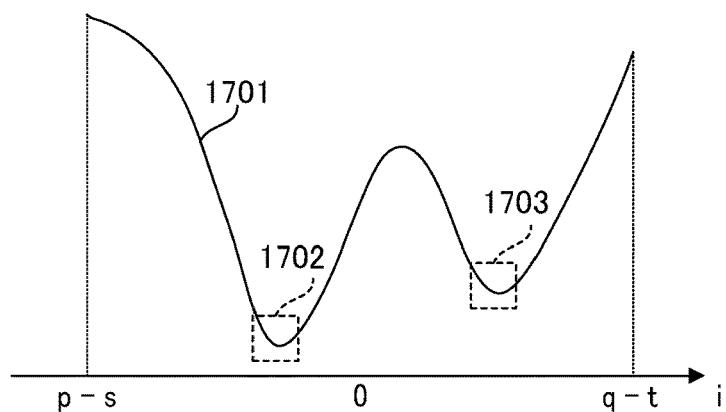
FIGS. 13A to 13C are diagrams illustrating graphs of correlation amounts in the present embodiment.

The process of calculating the correlation change amount and the focus shift amount will be described with reference to FIGS. 13A to 13C. FIG. 13A is the waveform illustrating the correlation amount. The number of shifts i is shown in the horizontal direction and the correlation amount is shown in the vertical direction. A graph line 1701 indicates the correlation amount waveform and ranges 1702 and 1703 indicate vicinities of extreme values. When the correlation amount is smaller, the degree of coincidence of images A and B is higher. Specifically, the range 1702 has the higher degree of coincidence of the images A and B than the range 1703. Subsequently, the method of calculating the correlation change amount (denoted by ΔCOR) will be described.

First, the correlation change amount ΔCOR is calculated from a correlation amount difference at every other shift interval from the correlation amount waveform of FIG. 13A. The correlation change amount ΔCOR[i] is calculated by the following Formula (9) using the number of shifts i, the minimum number of shifts "p−s," and the maximum number of shifts "q−t."

$$\Delta COR[i] = COR[i-1] - COR[i+1] \qquad (9)$$

Here, i is (p−s+1)≤i≤(q−t−1).

Figure 13B:
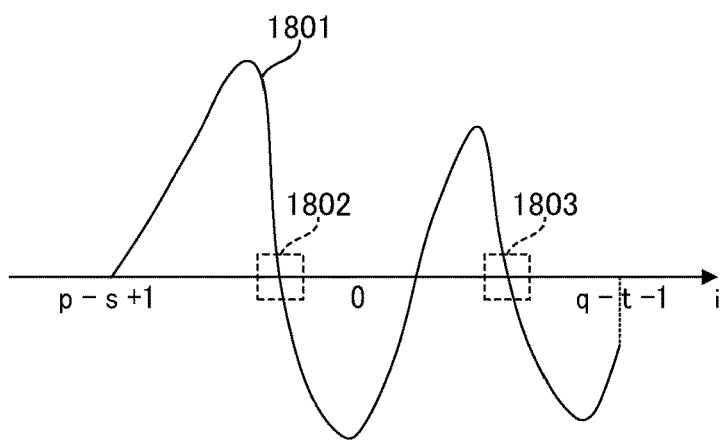

FIG. 13B is a waveform diagram illustrating the correlation change amount ΔCOR. The number of shifts i is shown in the horizontal direction and a correlation change amount ΔCOR is shown in the vertical direction. A graph line 1801 indicates a correlation change amount waveform and the correlation change amount ΔCOR changes from the positive value to the negative value in ranges 1802 and 1803. The position at which the correlation change amount ΔCOR becomes 0 is referred to as a zero-cross point. The coincidence of the images A and B is highest at the zero-cross point within the range 1802. At this time, the shift amount becomes the focus shift amount. The shift amount corresponding to the zero-cross point is a real number value.

Figure 13C:
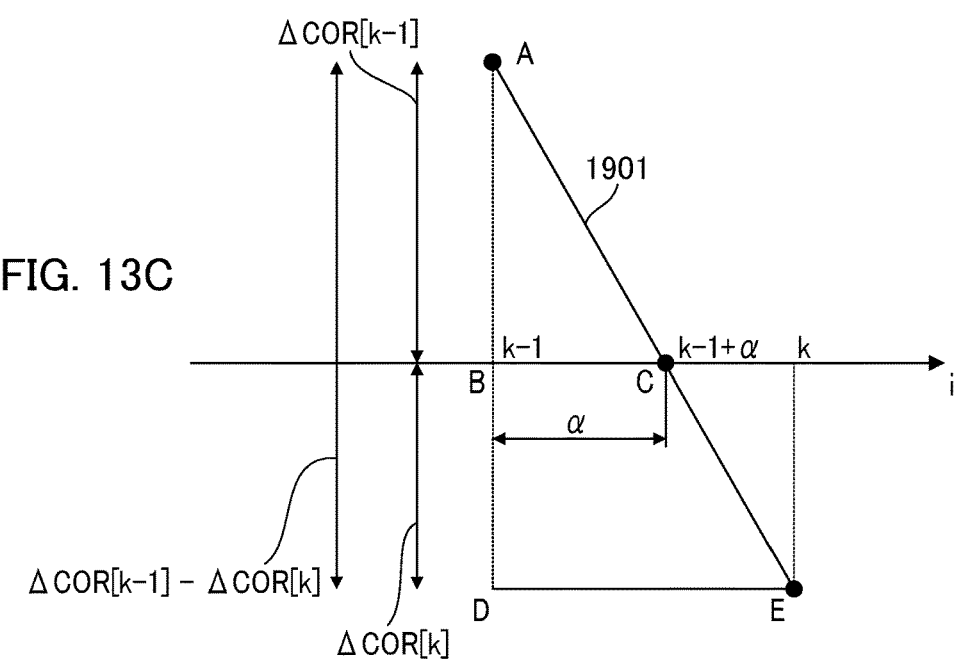

FIG. 13C is a diagram illustrating an enlarged range 1802 of FIG. 13B and a graph line 1901 is a part of the graph line 1801 indicating the correlation change amount ΔCOR. Using FIG. 13C, the method of calculating the focus shift amount (denoted by PRD) will be described.

The focus shift amount PRD is divided into an integer part β, and a fractional part α. The correlation change amount in k−1 on the horizontal axis (i-axis) is indicated by a point A and the correlation change amount in k is indicated by a point E. A point B indicates a foot of a perpendicular from the point A to the horizontal axis. A point C is an intersection between a segment line AE and the horizontal axis and its coordinate on the horizontal axis is k−1+α. A point D indicates the foot of a perpendicular from the point E to a straight line passing through the point A and the point B and its coordinate on the horizontal axis is k−1. The fractional part α can be calculated by the following Formula (10) from the similarity relation between a triangle ABC and a triangle ADE in FIG. 13C.

$$AB:AD = BC:DE \qquad (10)$$

$$\Delta COR[k-1]:\Delta COR[k-1] - \Delta COR[k] = \alpha:k - (k-1)$$

$$\alpha = \frac{\Delta COR[k-1]}{\Delta COR[k-1] - \Delta COR[k]}$$

The integer part β, can be calculated from the point C of FIG. 13C by the following Formula (11).

$$\beta = k - 1 \qquad (11)$$

According to the above, a focus shift amount PRD is calculated from the sum of α and β. When the lens drive amount is calculated from PRD, it is necessary to obtain the defocus amount by multiplying by a coefficient. This coefficient is the conversion coefficient depending upon the camera system or the lens and is determined according to a well-known method.

Next, the image recording process of a still image indicated by S415 of FIG. 4 will be described with reference to FIG. 14. In S801, the camera control unit 212 determines the current image recording mode. The example of two types of mode as the image recording mode will be described. The first recording mode is the recording mode of the normally compressed image signal. In this case, the process proceeds to S802. In S802, the image signal A and an image signal B of each pixel are added and handled as image signals in a Bayer array illustrated in FIGS. 2A to 2C, the development process and the compression process of a JPEG type or the like are performed, and the process of recording in the file is executed. JPEG is an abbreviation for "Joint Photographic Experts Group."

On the other hand, the second recording mode is the RAW recording mode in which RAW data before image processing is recorded. In this case, the process proceeds to S811. The recording medium control unit 207 performs the process of recording the image signal A in S811 and performs the process of recording the image signal B in S812. The image signal A and the image signal B are output as the file for the recording medium 208 without performing the development process or irreversible compression. The specific example will be described with reference to FIGS. 15A to 15D.

Figure 15A:
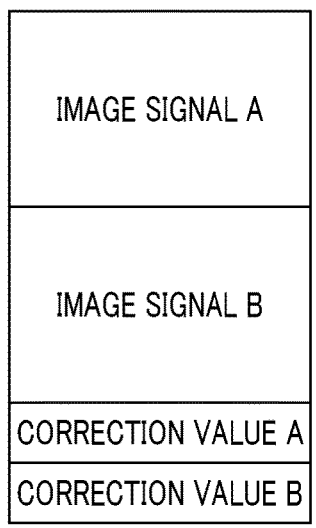
FIGS. 15A to 15D are diagrams illustrating a recording configuration of a still-image file in the present embodiment.
Figure 15B:
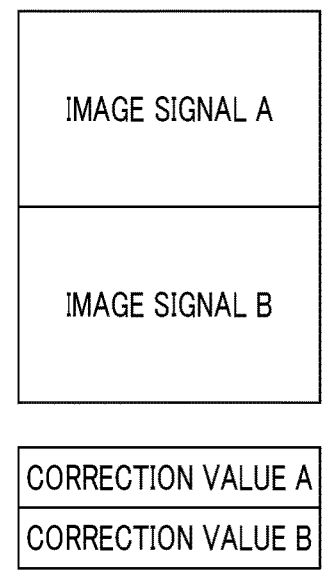

FIGS. 15A to 15D illustrate the configuration of the image signal saved in the file. This file is the file to be written to the recording medium 208 by the recording medium control unit 207. FIG. 15A illustrates the example in which the image signal A, the image signal B, and the correction value A and the correction value B of shading correction are integrated and saved in one file. Also, FIG. 15B illustrates the example in which the image signal A and the image signal B are saved in a first file and the correction value A and the correction value B of shading correction are saved in a second file.

In the case of FIG. 15B, there is a problem at the time of image processing in the PC or the like after file saving if the relationship between two files is not known. Therefore, there are the following examples.

Example 1

The method of setting base parts of two file names to be the same and distinguishing the file names using extensions as described below is provided.

DSC0001.RAW: File including information of image signal A and image signal B

DSC0001.SHD: File including information of correction value A and correction value B Example 2

A method of storing a file name of the second file in which the correction value A and the correction value B are recorded in the first file in which the image signal A and the image signal B are recorded is provided. Alternatively, the method of storing the file name of the first file in which the image signal A and the image signal B are recorded in the second file in which the correction value A and the correction value B are recorded may be provided.

Example 3

The method of separately recording an index file holding both the file name of the first file in which the image signal A and the image signal B are recorded and the file name of the second file in which the correction value A and the correction value B are recorded is provided. The index file is a third file including file names of, for example, DSC0001.RAW and DSC0001.SHD.

Figure 15C:
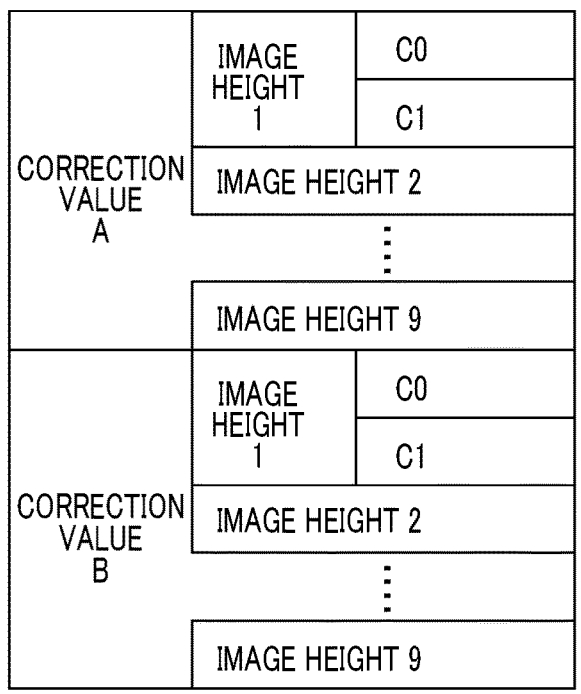
Figure 15D:
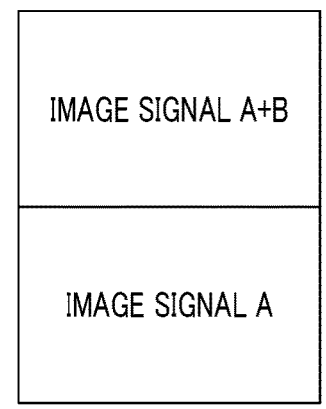

Also, FIG. 15D illustrates the example in which the image signal "A+B" and one image signal A are recorded in one file. For example, the image signal "A+B" is recorded in the file and then the image signal A is recorded in the file. The image signal B can be generated by subtracting the image signal A from the image signal "A+B" after post-processing when required by the user. Shading correction values may be saved in the single file or separate files.

Figure 14:
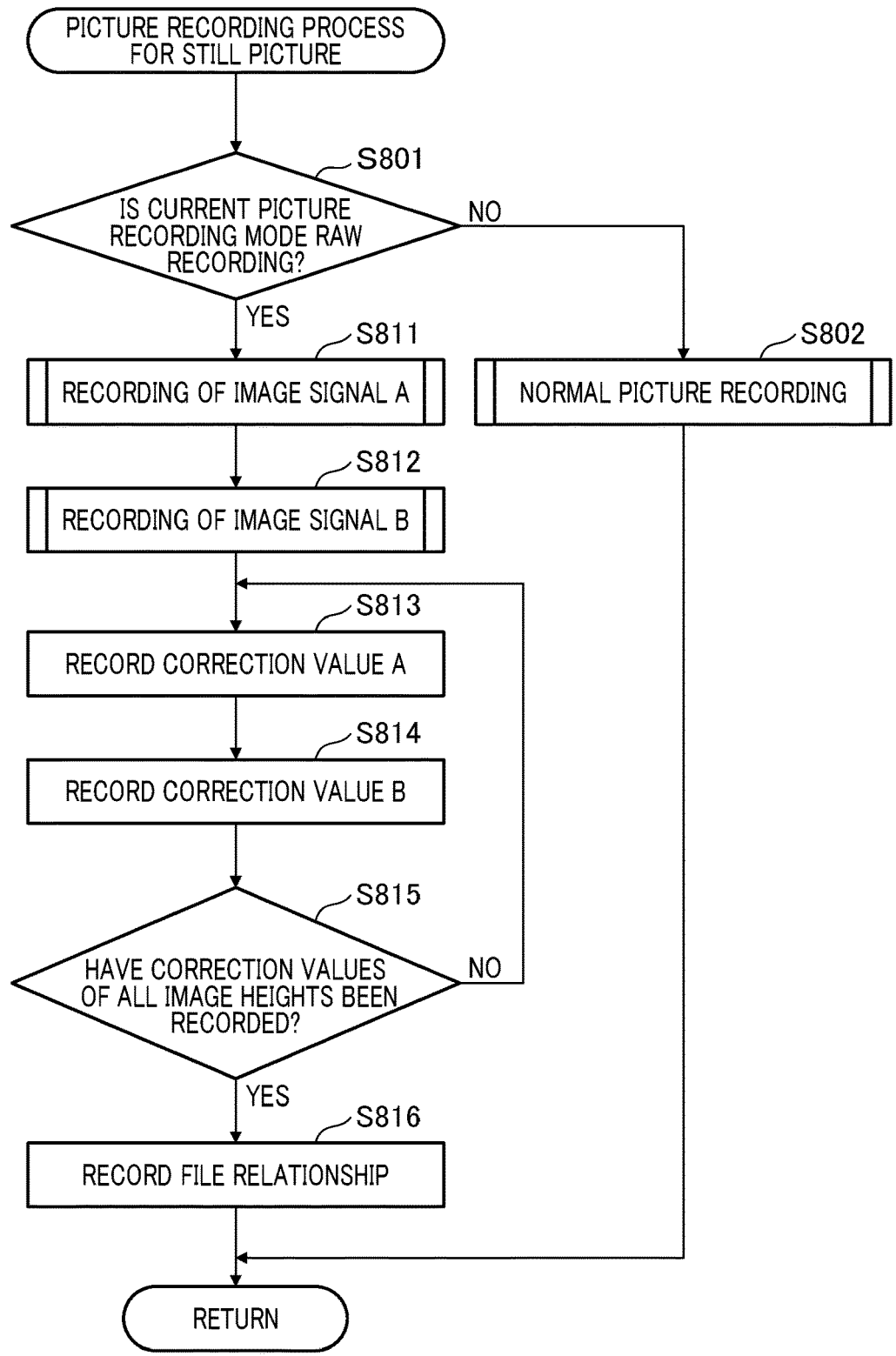
FIG. 14 is a flowchart illustrating an image recording process of a still image in the present embodiment.

The recording medium control unit 207 performs the process of recording the correction value A of the designated image height in S813 of FIG. 14 and performs the process of recording the correction value B of the designated image height in S814. FIG. 15C illustrates configurations of the correction value A and the correction value B written to file configuration 1 of FIG. 15A or file configuration 2 of FIG. 15B. Because FIG. 15C is a diagram illustrating a schematic configuration of the correction value table described with reference to FIGS. 11A and 11B, detailed description thereof will be omitted. S815 is the process of determining whether correction values of all image heights have been recorded. According to the configuration of FIG. 11A, the process proceeds to S816 if correction values of all 9 image heights have been recorded in the file. If there is the unrecorded correction value, the process is continued by proceeding to S813.

In S816, the recording process for specifying the file relationship is executed in recording of the plurality of files. This process is executed if the file of the image signal and the file of the correction value are recorded as separate files as in FIG. 15B. That is, after the process of recording information for associating two files and recording the file is executed, the image recording process of the still image ends.

In the present embodiment, an imaging apparatus which performs the imaging plane phase difference AF process can acquire the correction value capable of being known only during photographing by adding the shading correction value to the image signal as described with reference to FIG. 14 and FIGS. 15A to 15D. It is possible to perform shading correction on the image for each pupil division using the shading correction value after photographing. Because the correction value table illustrated in FIG. 11B includes only necessary correction values, it is possible to reduce the file size. Also, the process of saving the shading correction value corresponding to each pupil-divided image in the file is performed. As in the example illustrated in FIG. 10C, in the image signal A or the image signal B, one side becomes dark and quality is lowered when it is used as the single image. It is possible to sufficiently use the shading-corrected image only in the image signal according to shading correction using the correction value for each image signal. This image can be used in stereoscopic photography, refocusing processing, ghost removal processing, and the like.

According to the present embodiment, it is possible to acquire and record the correction value based on setting of the aperture of the lens, the focus detection position, the exit pupil distance, or the like capable of being known only during photographing and perform shading correction on the image of each pupil division after photographing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-008188, filed Jan. 19, 2016 which is hereby incorporated by reference wherein in its entirety.

What is claimed is:

1. An imaging apparatus comprising:
    an imaging element including a plurality of micro-lenses and a plurality of photoelectric conversion units correspond to the plurality of micro-lenses;
    one or more processors; and
    a memory storing instructions which, when executed by the one or more processors, cause the imaging apparatus to:
        generate a first image signal based on a signal from a first photoelectric conversion unit among the plurality of photoelectric conversion units and a second image signal based on signals from the first photoelectric conversion unit and a second photoelectric conversion unit different from the first photoelectric conversion unit among the plurality of photoelectric conversion units; and
        record a first correction parameter specific to the imaging element for correcting the first image signal, and a second correction parameter specific to the imaging element for correcting a third image signal based on the signal from the second photoelectric conversion unit in association with the first and second image signals in the memory,
    wherein one file including the first and second image signals and the first and second correction parameters is generated and the generated file is recorded in the memory.

2. The imaging apparatus according to claim 1, wherein the third image signal is not included in the generated file.

3. The imaging apparatus according to claim 1, wherein the first and second correction parameters recorded in the memory are recorded as parameters corresponding to a plurality of regions within an image based on the image signal.

4. The imaging apparatus according to claim 1, wherein the first correction parameter is a parameter for correcting a decrease in a light amount specific to the imaging element occurred in the first image signal, and the second correction parameter is a parameter for correcting the decrease in the light amount specific to the imaging element occurred in the third image signal.

5. The imaging apparatus according to claim 1, wherein the first and second correction parameters are parameters for correcting shading occurred in the first and third image signals.

6. The imaging apparatus according to claim 1, wherein the first and second correction parameters are determined according to the imaging element, an exit pupil distance, and an F number of an optical system for guiding a light flux from an object to the imaging element.

7. The imaging apparatus according to claim 1, wherein an image file including the second image signal without including the first image signal and the first and second correction parameters are generated and recorded in the memory in a mode.

8. The imaging apparatus according to claim 1, wherein the instructions, when executed by the one or more processors, further cause the imaging apparatus to correct the first image signal and the second image signal using the first and second correction parameters.

9. The imaging apparatus according to claim 8, wherein the instructions, when executed by the one or more processors, further cause the imaging apparatus to perform focus detection by a correlation calculation using the first and second image signals corrected using the first and second correction parameters and to perform focus adjustment based on a result from the focus detection.

10. An imaging apparatus comprising:
    an imaging element having a first photoelectric conversion unit and a second photoelectric conversion unit configured to receive light flux passing through different pupil regions of an optical system;
one or more processors; and
a memory storing instructions which, when executed by the one or more processors, cause the imaging apparatus to:
generate a first image signal based on a signal from the first photoelectric conversion unit and a third image signal based on a signal from the second photoelectric conversion unit; and
record a first correction parameter specific to the imaging element for correcting the first image signal, and a second correction parameter specific to the imaging element for correcting a third image signal based on the signal from the second photoelectric conversion unit in association with the first and third image signals in the memory,
wherein one file including the first and third image signals and the first and second correction parameters is generated and the generated file is recorded in the memory.

11. The imaging apparatus according to claim 10, wherein the first and second correction parameters recorded in the memory are recorded as parameters corresponding to a plurality of regions within an image based on the image signal.

12. The imaging apparatus according to claim 10, wherein the first correction parameter is a parameter for correcting a decrease in a light amount specific to the imaging element occurred in the first image signal and the second correction parameter is a parameter for correcting the decrease in the light amount specific to the imaging element occurred in the third image signal.

13. The imaging apparatus according to claim 10, wherein the first and second correction parameters are parameters for correcting shading occurred in the first and third image signals.

14. The imaging apparatus according to claim 10, wherein the first and second correction parameters are determined according to the imaging element, an exit pupil distance, and an F number of an optical system for guiding a light flux from an object to the imaging element.

15. The imaging apparatus according to claim 10, wherein the instructions, when executed by the one or more processors, further cause the imaging apparatus to correct the first image signal and the third image signal using the first and second correction parameters.

16. The imaging apparatus according to claim 15, wherein the instructions, when executed by the one or more processors, further cause the imaging apparatus to perform focus detection by a correlation calculation using the first and third image signals corrected using the first and second correction parameters, and to perform focus adjustment based on a result from the focus detection.

17. A control method of an imaging apparatus having an imaging element including a plurality of micro-lenses and a plurality of photoelectric conversion units corresponding to the plurality of micro-lenses, the control method comprising:
generating a first image signal based on a signal from a first photoelectric conversion unit among the plurality of photoelectric conversion units and a second image signal based on signals from the first photoelectric conversion unit and a second photoelectric conversion unit different from the first photoelectric conversion unit among the plurality of photoelectric conversion units;
recording a first correction parameter specific to the imaging element for correcting the first image signal, and a second correction parameter specific to the imaging element for correcting a third image signal based on the signal from the second photoelectric conversion unit in association with the first and second image signals in a memory;
generating one file including the first and second image signals and the first and second correction parameters; and
recording the generated file in the memory.

18. A control method of an imaging apparatus having an imaging element having a first photoelectric conversion unit and a second photoelectric conversion unit configured to receive light flux passing through different pupil regions of an optical system, the control method comprising:
generating a first image signal based on a signal from the first photoelectric conversion unit and a third image signal based on a signal from the second photoelectric conversion unit;
recording a first correction parameter specific to the imaging element for correcting the first image signal, and a second correction parameter specific to the imaging element for correcting a third image signal based on the signal from the second photoelectric conversion unit in association with the first and third image signals in a memory;
generating one file including the first and third image signals and the first and second correction parameters; and
recording the generated file in the memory.

19. An imaging apparatus comprising:
an imaging element including a plurality of micro-lenses and a plurality of photoelectric conversion units corresponding to the plurality of micro-lenses;
one or more processors; and
a memory storing instructions which, when the instructions are executed by the one or more processors, cause the imaging apparatus to:
generate a first image signal based on a signal from a first photoelectric conversion unit among the plurality of photoelectric conversion units and a second image signal based on signals from the first photoelectric conversion unit and a second photoelectric conversion unit different from the first photoelectric conversion unit among the plurality of photoelectric conversion units;
record a first correction parameter specific to the imaging element for correcting the first image signal, and a second correction parameter specific to the imaging element for correcting a third image signal based on the signal from the second photoelectric conversion unit in association with the first and second image signals in the memory;
correct the first image signal and the second image signal using the first and second correction parameters;
perform focus detection by a correlation calculation using the first and second image signals corrected using the first and second correction parameters; and
perform focus adjustment based on a result from the focus detection.

20. An imaging apparatus having comprising:
an imaging element having a first photoelectric conversion unit and a second photoelectric conversion unit configured to receive light flux passing through different pupil regions of an optical system;

one or more processors; and
a memory storing instructions which, when the instructions are executed by the one or more processors, cause the imaging apparatus to:
  generate a first image signal based on a signal from the first photoelectric conversion unit and a third image signal based on a signal from the second photoelectric conversion unit;
  record a first correction parameter specific to the imaging element for correcting the first image signal, and a second correction parameter specific to the imaging element for correcting a third image signal based on the signal from the second photoelectric conversion unit in association with the first and third image signals in the memory;
  correct the first image signal and the third image signal using the first and second correction parameters;
  perform focus detection by a correlation calculation using the first and third image signals corrected using the first and second correction parameters; and
  perform focus adjustment based on a result of the focus detection.

21. A control method of an imaging apparatus having an imaging element including a plurality of micro-lenses and a plurality of photoelectric conversion units corresponding to the plurality of micro-lenses, the control method comprising:
  generating a first image signal based on a signal from a first photoelectric conversion unit among the plurality of photoelectric conversion units and a second image signal based on signals from the first photoelectric conversion unit and a second photoelectric conversion unit different from the first photoelectric conversion unit among the plurality of photoelectric conversion units;
  recording a first correction parameter specific to the imaging element for correcting the first image signal, and a second correction parameter specific to the imaging element for correcting a third image signal based on the signal from the second photoelectric conversion unit in association with the first and second image signals in a memory;
  correcting the first image signal and the second image signal using the first and second correction parameters;
  performing focus detection by a correlation calculation using the first and second image signals corrected by using the first and second correction parameters; and
  performing focus adjustment based on a result from the focus detection.

22. A control method of an imaging apparatus having an imaging element having a first photoelectric conversion unit and a second photoelectric conversion unit configured to receive light flux passing through different pupil regions of an optical system, the control method comprising:
  generating a first image signal based on a signal from the first photoelectric conversion unit and a third image signal based on a signal from the second photoelectric conversion unit;
  recording a first correction parameter specific to the imaging element for correcting the first image signal, and a second correction parameter specific to the imaging element for correcting a third image signal based on the signal from the second photoelectric conversion unit in association with the first and third image signals in a memory;
  correcting the first image signal and the third image signal using the first and second correction parameters;
  performing focus detection by a correlation calculation using the first and third image signals corrected using the first and second correction parameters; and
  performing focus adjustment based on a result of the focus detection.

23. An image processing apparatus comprising:
one or more processors; and
a memory storing instructions which, when executed by the one or more processors, cause the image processing apparatus to:
  acquire a first image signal based on a signal from a first photoelectric conversion unit of an imaging element and a second image signal based on signals from the first photoelectric conversion unit and a second photoelectric conversion unit of the imaging element configured to receive light flux passing through different pupil regions of an optical system, wherein the second photoelectric conversion unit receives the light flux passing through the pupil region different from the pupil region through which the light flux received by the first photoelectric conversion unit passes;
  acquire a first correction parameter specific to the imaging element for correcting the first image signal, and a second correction parameter specific to the imaging element for correcting a third image signal based on the signal from the second photoelectric conversion unit in association with the first and second image signals in a memory; and
  correct the first image signal using the first correction parameter and correcting the third image signal using the second correction parameter,
  wherein the first and second image signals and the first and second correction parameters is recorded in one file in the memory.

24. The image processing apparatus according to claim 23, wherein the first and second correction parameters recorded in the memory are recorded as parameters corresponding to a plurality of regions within an image based on the image signal.

25. The image processing apparatus according to claim 23, wherein the first correction parameter is a parameter for correcting a decrease in a light amount specific to the imaging element occurred in the first image signal, and the second correction parameter is a parameter for correcting the decrease in the light amount specific to the imaging element occurred in the third image signal.

26. The image processing apparatus according to claim 23, wherein the first and second correction parameters are parameters for correcting shading occurred in the first and third image signals.

27. The image processing apparatus according to claim 23, wherein the first and second correction parameters are determined according to the imaging element, an exit pupil distance, and an F number of an optical system for guiding a light flux from an object to the imaging element.

28. A control method of an image processing apparatus, the method comprising:
  acquiring a first image signal based on a signal from a first photoelectric conversion unit of an imaging element and a second image signal based on signals from the first photoelectric conversion unit and a second photoelectric conversion unit of the imaging element configured to receive light flux passing through different pupil regions of an optical system, wherein the second photoelectric conversion unit receives the light flux passing through the pupil region different from the pupil region through which the light flux received by the first photoelectric conversion unit passes;

acquiring a first correction parameter specific to the imaging element for correcting the first image signal, and a second correction parameter specific to the imaging element for correcting a third image signal based on the signal from the second photoelectric conversion unit in association with the first and third image signals in a memory; and correcting the first image signal using the first correction parameter and correcting the third image signal using the second correction parameter, wherein the first and second image signals and the first and second correction parameters is recorded in one file in the memory.

29. An image processing apparatus comprising:
one or more processors; and
a memory storing instructions which, when executed by the one or more processors, cause the image processing apparatus to:
  acquire a first image signal based on a signal from a first photoelectric conversion unit of an imaging element and a third image signal based on a signal from a second photoelectric conversion unit of the imaging element configured to receive light flux passing through different pupil regions of an optical system, wherein the second photoelectric conversion unit receives the light flux passing through the pupil region different from the pupil region through which the light flux received by the first photoelectric conversion unit passes;
  acquire a first correction parameter specific to the imaging element for correcting the first image signal, and a second correction parameter specific to the imaging element for correcting the third image signal in association with the first and third image signals in a memory; and
  correct the first image signal using the first correction parameter and correcting the third image signal using the second correction parameter,
  wherein the first and third image signals and the first and second correction parameters is recorded in one file in the memory.

30. The image processing apparatus according to claim 29, wherein the first and second correction parameters recorded in the memory are recorded as parameters corresponding to a plurality of regions within an image based on the image signal.

31. The image processing apparatus according to claim 29, wherein the first correction parameter is a parameter for correcting a decrease in a light amount specific to the imaging element occurred in the first image signal, and the second correction parameter is a parameter for correcting the decrease in the light amount specific to the imaging element occurred in the third image signal.

32. The image processing apparatus according to claim 29, wherein the first and second correction parameters are parameters for correcting shading occurred in the first and third image signals.

33. The image processing apparatus according to claim 29, wherein the first and second correction parameters are determined according to the imaging element, an exit pupil distance, and an F number of an optical system for guiding a light flux from an object to the imaging element.

34. A control method of an image processing apparatus, the method comprising:
  acquiring a first image signal based on a signal from a first photoelectric conversion unit of an imaging element and a third image signal based on a signal from a second photoelectric conversion unit of the imaging element configured to receive light flux passing through different pupil regions of an optical system, wherein the second photoelectric conversion unit receives the light flux passing through the pupil region different from the pupil region through which the light flux received by the first photoelectric conversion unit passes;
  acquiring a first correction parameter specific to the imaging element for correcting the first image signal, and a second correction parameter specific to the imaging element for correcting the third image signal in association with the first and third image signals in a memory; and
  correcting the first image signal using the first correction parameter and correcting the third image signal using the second correction parameter,
  wherein the first and third image signals and the first and second correction parameters is recorded in one file in the memory.

* * * * *